United States Patent [19]
Coffman

[11] Patent Number: 4,964,205
[45] Date of Patent: Oct. 23, 1990

[54] METHOD FOR MAKING SCREW CAP JAR

[75] Inventor: Paul M. Coffman, Houston, Tex.

[73] Assignee: Rampart Packaging Inc., Williamsburg, Va.

[21] Appl. No.: 335,313

[22] Filed: Apr. 10, 1989

Related U.S. Application Data

[62] Division of Ser. No. 205,964, Jun. 13, 1988, Pat. No. 4,844,270.

[51] Int. Cl.⁵ .............................................. B23P 11/00
[52] U.S. Cl. ...................................... 29/401.1; 29/447; 29/453; 29/456; 264/512
[58] Field of Search ................ 29/453, 463, 450, 447, 29/516, 517, 401.1, 456; 264/512, 516, 342 R, 230, 275, 328.1

[56] References Cited

U.S. PATENT DOCUMENTS

| | | | |
|---|---|---|---|
| 1,558,364 | 10/1925 | Iverson | 29/463 |
| 3,438,116 | 4/1969 | Stengle, Jr. | 29/447 |
| 3,787,547 | 1/1974 | Stephan | 264/516 |
| 3,803,700 | 4/1974 | Tischlinger | 29/447 |
| 4,316,318 | 2/1982 | Mineo | 29/512 |

Primary Examiner—Jill L. Heitbrink
Attorney, Agent, or Firm—Donald F. Haas

[57] ABSTRACT

A method for converting a thin-walled container to a jar with a rigid threaded neck which will accept a conventional threaded screw cap which comprises separately forming a thin-walled container and a rigid threaded neck ring and then attaching the ring to the outside of the container and the jar so made.

7 Claims, 3 Drawing Sheets

METHOD FOR MAKING SCREW CAP JAR

This is a continuation of application Ser. No. 205,964, filed June 13, 1988, now U.S. Pat. No. 4,844,270.

BACKGROUND OF THE INVENTION

In the past, the conventional means for storing perishable foods has involved the use of glass jars and metal cans which have an inherent oxygen barrier characteristic. In recent years, a new concept has emerged through the use of certain plastic materials which have low permeability to oxygen and moisture. One of the major methods of manufacture of plastic barrier containers involves the coextrusion of plastic sheet comprised of a barrier material and a less expensive matrix material. The sheet is heated and shaped by a thermoforming process.

The thermoforming process lends itself well to manufacture of plastic cans and a variety of tapered containers which can be sealed by a number of methods such as double seamed metal lids or adhesive sealed aluminum lids. One product for which thermoforming is not generally suitable is screw cap jars which represent a large portion of the food storage market. The thermoforming process does not normally provide sufficient wall thickness and rigidity at the open end necessary for a satisfactory screw type closure. The present invention provides a thermoformed screw top jar.

SUMMARY OF THE INVENTION

The present invention relates to a method for converting a thin walled container to a jar with a rigid threaded neck which will accept a conventional threaded screw cap and to the jar itself. The method comprises separately forming a thin walled container and a rigid threaded neck ring and then attaching the ring to the outside of the container. The container is preferably thermoformed from a plastic or a multilayered plastic laminate or coextrusion and has an integrally formed, outwardly directed flange at the open end thereof which assists in holding the neck ring on the container and provides a flat sealing surface for the screw cap. In the most preferred embodiment, the container is formed from a multilayered coextrusion comprised of polypropylene and an ethylene vinyl alcohol copolymer or polyvinylidiene chloride and the neck ring is an injection molded ring of polypropylene or another rigid plastic.

DETAILED DESCRIPTION OF THE INVENTION

Figure 1:
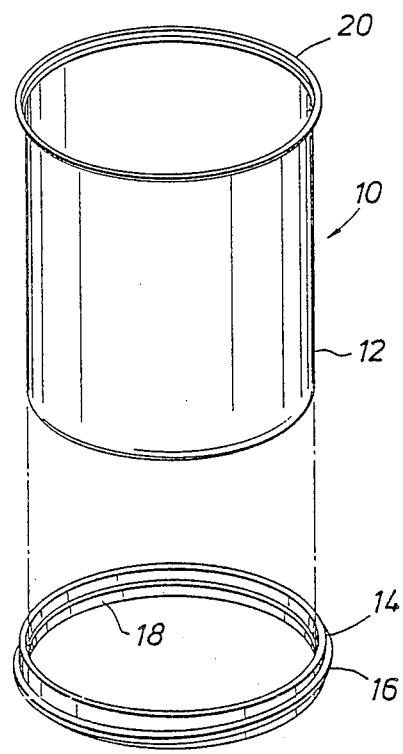
FIGS. 1, 2 and 3 illustrate how a threaded neck ring is attached to a container by either force fitting or shrink fitting.
Figure 3:
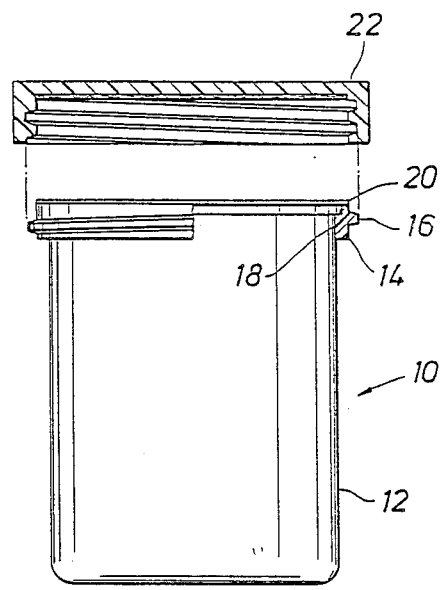
Figure 2:
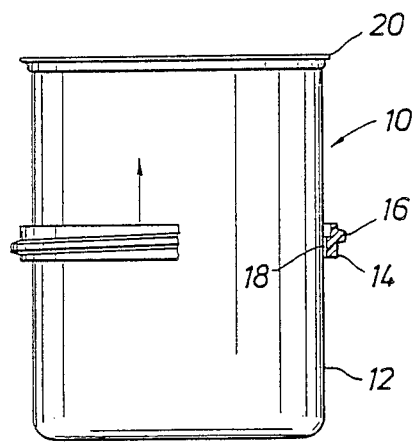

In its simplest form, as shown in FIG. 1, 2 and 3, the article 10 of the present invention can be envisioned as a straight-walled or slightly tapered plastic can 12 and a neck ring 14 which fits over the can and has screw threads 16 on the outside and a flat surface 18 on the inside. The inside diameter of the neck ring 14 is slightly smaller than the outside diameter of the can 12, i.e. 0.5% smaller, and thus the result is an interference fit, a fit which holds the ring 14 tightly to the can 16.

The can or container is preferably formed of thermoformable plastic material but it may be formed of other materials such as paper, cardboard or metal. The container may be a single layer or multiple layer combined by well-know lamination or coextrusion techniques.

Figure 4:
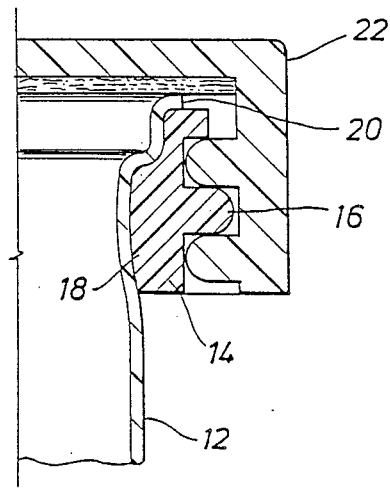
FIG. 4 shows how the cap is attached to the neck ring.

Preferably, the container has an integrally formed outwardly directed flange 20 at its open end. The main purpose of the flange 20 is to provide a flat surface for the screw cap 22 to seal against as shown in FIG. 4. It also improves the continuity of the container surface, which is especially important in vapor barrier applications, and assists in holding the neck ring on the container. In the most preferred embodiment, the outside diameter of the flange 20 is equal to or less than the root diameter of the neck ring 14 screw threads to prevent interference with the screw cap threads.

Figure 5:
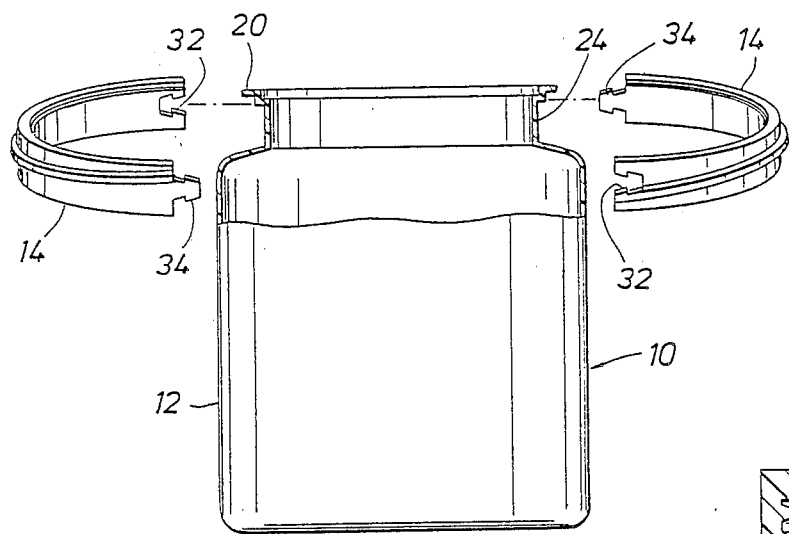
FIGS. 5 and 6 illustrate a two piece snap-on neck ring being attached to a container with a recessed portion at the open end.
Figure 6:
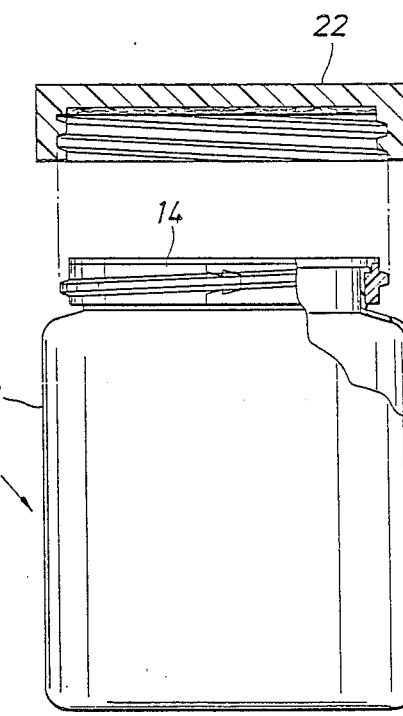

In many commercial applications, it is preferred that the container is recessed at the open end, as shown in FIG. 5 and 6, so that the neck ring 14 can be positioned in the recessed portion 24. This allows the use of a screw cap 22 with an outside diameter which is about the same as the outside diameter of the main body of the container. This is desirable for space economy in shipping as well as producing a more aesthetically pleasing container.

Such articles are especially useful in vapor barrier applications where the wall of the container is a multi-layered laminate or coextrusion which incorporates a vapor barrier material as one of the layers.

In its most preferred embodiment, the container is formed by coextrusion of a matrix material, such as polypropylene, polypropylene-based polymers, polystyrene, polyvinyl chloride, high density polyethylene or any rigid thermoplastic, with a vapor barrier material such as an ethylene vinyl alcohol copolymer, polyvinylidene chloride or other vapor barrier materials. The neck ring, which is preferably injection molded, may be formed of any rigid plastic, either thermoplastic or thermosetting, such as polypropylene, polypropylene-based polymers, phenolic resins, polystyrene, polycarbonate, etc.

Figure 7:
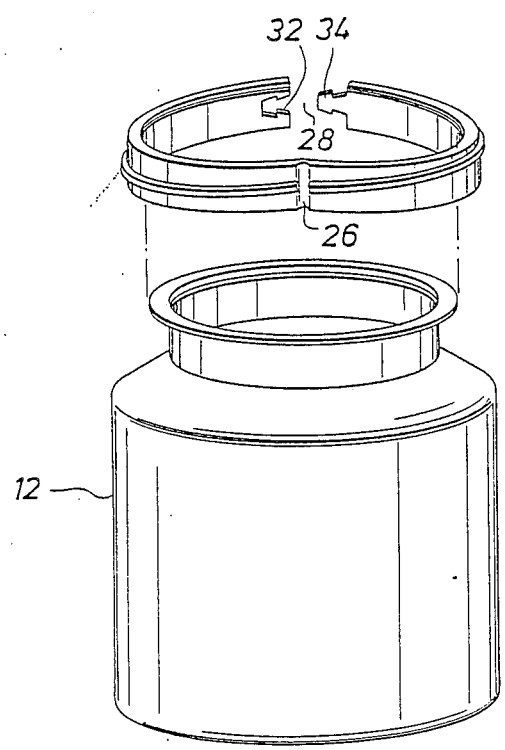
FIGS. 7 and 8 illustrate the attachment of a hinged neck ring to a container similar to the one of FIGS. 5 and 6.
Figure 8:
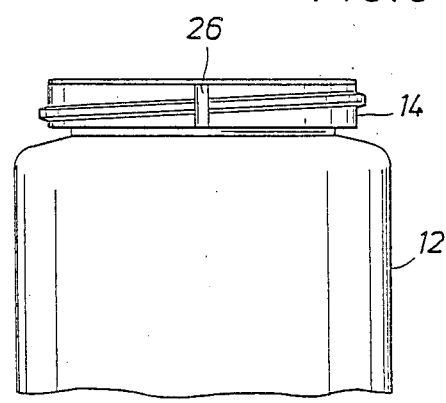

The neck ring 14 may be formed, preferably by injection molding, in one piece, as shown in FIG. 1, 2 and 3, or in 2 or more pieces, as shown in FIG. 5 and 6, which can fit together on the container 10, preferably by mechanical interlocking means. Also, the neck ring 14 can be formed in one discontinuous piece which has a hinge 26 on one side and has an opposing opening 28 as shown in FIG. 7 and 8. Preferably, a means 30 for mechanically interlocking the open ends together is included. Such mechanical interlocking means can be a simple male-female snap-on arrangement wherein the female part 32 on one portion is forcibly spread apart to accommodate the male part 34 on another portion. Almost any interlocking device will be sufficient.

When the neck ring 14 is formed in one uninterrupted piece it may be attached to the container 10 by force fitting or shrink fitting as shown in FIG. 1, 2 and 3. Force fitting is specifically applicable to a tapered container where the neck ring 14 is simply pushed forcefully into position on the container 10 under and against the flange 20, thus creating an interference fit. Shrink fitting is accomplished by expanding the neck ring 14 thermally by preheating it, slipping it into position over an end of the container and allowing it to shrink by cooling to ambient conditions, thus inducing an interference fit.

When the neck ring 14 is formed in 2 or more pieces as shown in FIG. 5 and 6, the pieces are simply fit together on the container 10 at the end thereof under and against the flange 20. The hinged neck ring 14 of FIG. 7 and 8 is placed in the same position on the container 10, the hinge 26 is rotated and the open ends 32 and 34 are brought together. It is preferred that mechanical interlocking devices be used to attach the open ends of the neck ring pieces in these embodiments when the container 10 has a recessed portion 24 as shown in FIG. 5 through 8. Furthermore, the neck rings described in this paragraph are preferably expanded thermally before being put on the container and then shrunk by cooling to provide a good interference fit.

Figure 9:
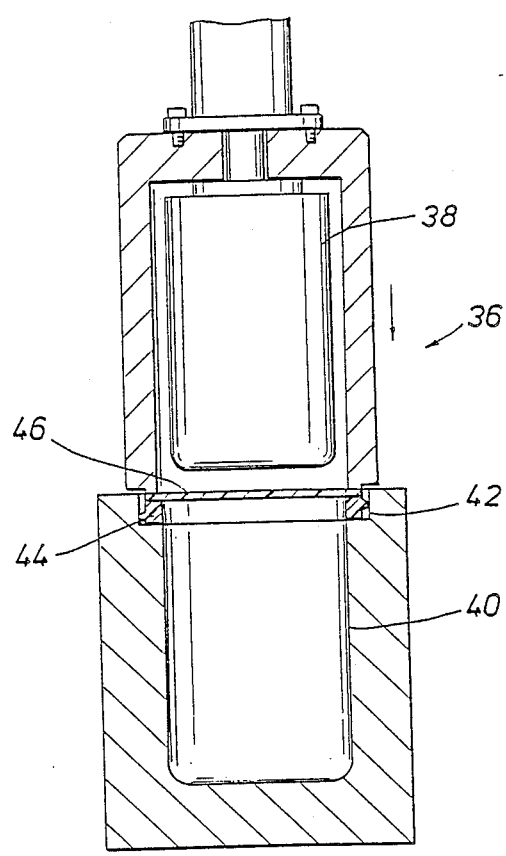
FIGS. 9 and 10 illustrate how the container can be formed within the neck ring.
Figure 10:
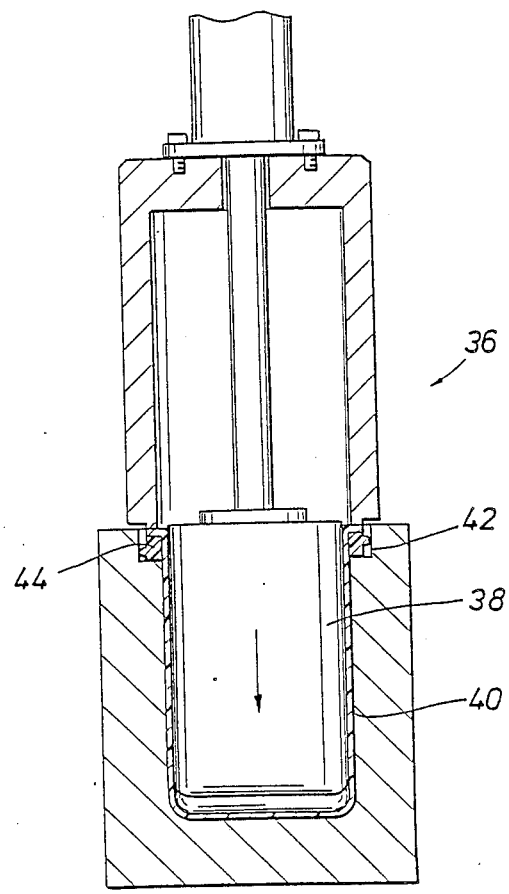

Yet another approach to incorporating the neck ring on the container involves inserting the neck ring into a forming tool and then forming the plastic billet inside the neck ring. This is shown in FIG. 9 and 10 wherein a forming tool 36 includes a forming plug 38 and a mold 40 which has a flange cavity 42 at the top end. The ring 44 is inserted in place on the flange cavity 42 and the billet 46 is moved into position as shown. The forming plug 38 is moved downwardly and air pressure is applied to stretch the billet 46. Then the plug 38 is removed and the container with the ring 44 thereon is ejected.

What is claimed is:

1. A method for converting a thin-walled container to a jar with a rigid threaded neck which will accept a conventional threaded screw cap which comprises separately forming a thin-walled container and a rigid threaded neck ring and then attaching the ring to the outside of the container, wherein the neck ring is discontinuous and has a hinge on one side and an opposing opening which includes means for mechanical interlocking.

2. The method of claim 1 wherein the open end of the container is recessed and the neck ring is positioned in the recess.

3. The method of claim 2 wherein the outside diameter of the screw cap is about the same as the outside diameter of the main body of the container.

4. The method of claim 1 wherein the container is theremoformed from a material selected from the group consisting of a plastic, a multi-layered plastic laminate and a multi-layered plastic coextrusion.

5. The method of claim 4 wherein the container has an integrally formed outwardly directed flange at the open end thereof which assists in holding the neck ring on the container and provides a flat sealing surface for the screw cap.

6. The method of claim 5 wherein the container is formed from a material selected from the group consisting of a multi-layered plastic laminate and a multi-layered plastic coextrusion, said material containing a vapor barrier material.

7. The method of claim 6 wherein the container is formed from a multi-layered coextrusion comprised of polypropylene and a vapor barrier material selected from the group consisting of an ethylene vinyl alcohol copolymer and polyvinylidiene chloride and the neck ring is an injection molded ring of a material selected from the group consisting of polypropylene and another rigid plastic.

* * * * *